Patented Aug. 8, 1944

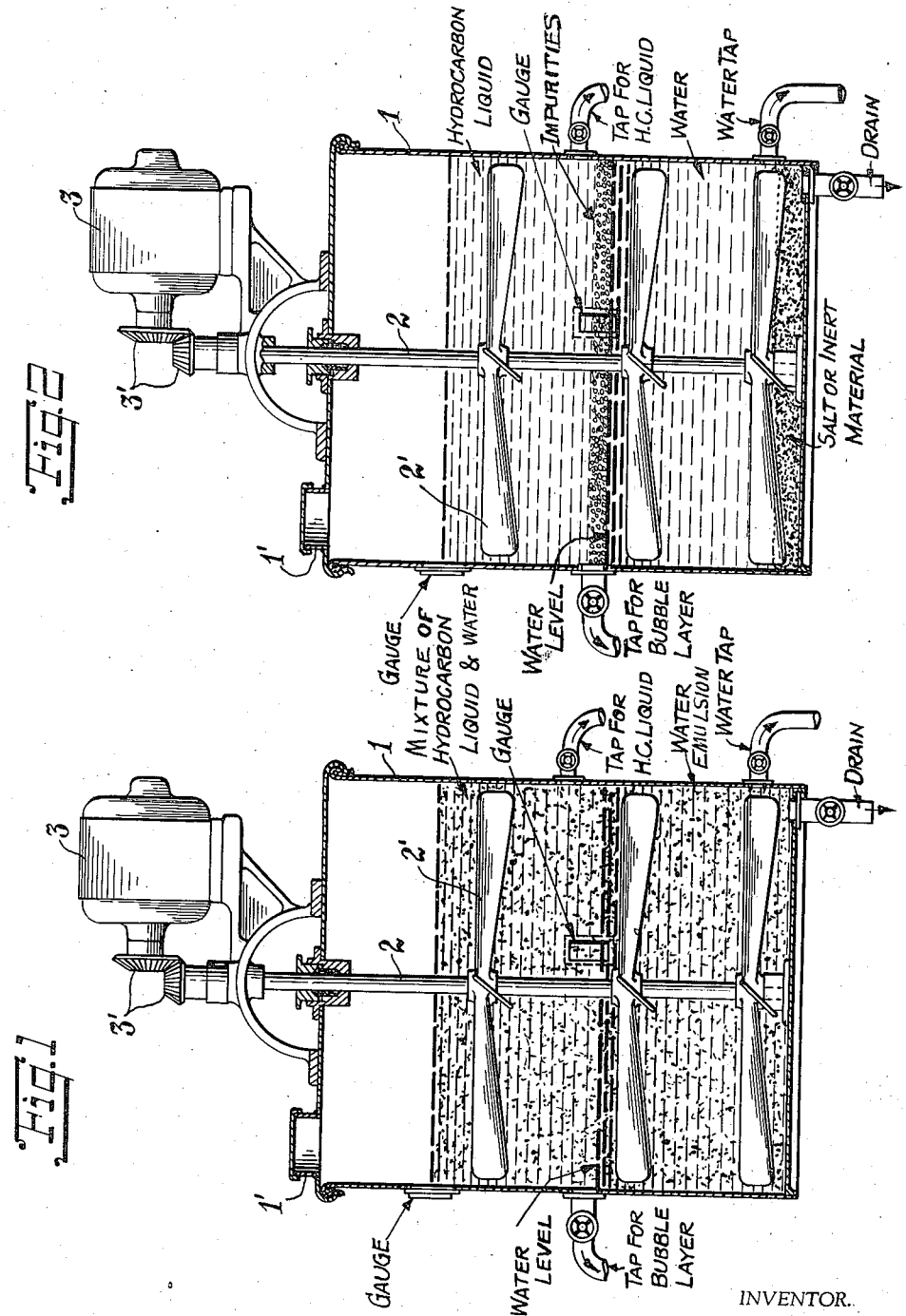

2,355,291

UNITED STATES PATENT OFFICE 2,355,291

METHOD OF PURIFYING HYDROCARBON LIQUIDS

Thomas S. Hamilton, Beverly Hills, Calif., assignor to Dorothy Di Frasso, Beverly Hills, Calif.

Application December 10, 1941, Serial No. 422,324

5 Claims. (Cl. 196—146)

This invention relates to methods or processes of purifying, without distillation, hydrocarbon liquids such as gasoline, naphtha, coal oil and the like, and constitutes an improvement upon my Patent No. 1,018,971, dated February 27, 1912, for Method or process of purifying hydrocarbon liquids.

In accordance with my said patent, a hydrocarbon liquid is introduced into a tank containing a solution which will combine with such hydrocarbon liquid to form an emulsion, the mixture is agitated to produce such emulsion, the emulsion is removed from the tank and solution therein and the removed emulsion is treated to separate the impurities from the pure oil therein. The removed emulsion was also subjected to shock to separate the impurities from the oil; the emulsion was conducted in a continuous stream from the tank and the stream was subjected to shock or jar to cause separation of the heavy or impure oil residue from the light or pure oil; and the light purified oil preferably was filtered in a tank containing casing salt. The emulsion produced resembled a gravy in appearance and the lighter, purer components of pure oil were forced under heavy pressure through a cleaning agent. In the formation of the emulsion hereinabove referred to the tank was charged with a saline solution, or brine produced by supplying the tank with a requisite quantity of salt and water and preferably by employing a considerable quantity of rock salt in small lumps, there being such a proportion of salt that the water cannot dissolve all of it. An agitator was then caused to operate and effect violent agitation of the solution and while, in such violent agitation the liquid hydrocarbon, naphtha, gasoline or the like was sprayed into the tank preferably in a finely divided state and under a pressure of one hundred and fifty pounds or more so that practically every atom of naphtha or liquid comes in contact with the solution and an emulsion is produced. The paraffin or waxy constituents of the oil having an affinity for the salt, accumulates on the lumps thereof and either flakes off or becomes part of the emulsion and rises to the top of the solution. As long as the operation is in progress, and it continues indefinitely, this accumulation of the waxy constituents of the oil on the salt and the flaking or separating of the same from the salt continues, the lumps of salt gradually diminishing in size and from time to time additional salt, some of it in crystal form, is added to compensate especially for that lost in the crystalline form in the operation, it being also understood that the loss of water incident to the passage of the emulsion from the tank is replaced in order that the quantity of saline solution shall remain substantially the same as long as the operation is in progress. During the treatment described, an emulsion consisting of light and heavy oil, water, salt and impurities is gradually produced and rises slowly to the top until eventually it attains a given level and flows through a connected pipe in a continuous stream, and in dropping through said pipe from the upper part thereof down into another conductor or second receptacle is subjected to shock, jar or vibration which effectually separates the emulsion into light or pure oil and impure oil or residuum as is evidenced by the fact that this impure oil or residuum will now sink to the bottom of the second receptacle while the pure oil rises above and flows out through another pipe. Water and residuum may be drawn off from time to time. To give a lighter and more volatile character to the purified product, it may be conducted into still another vessel and aerated by means of a dry air supply and the liquid is also preferably further cleansed by being pumped under heavy pressure and carrying air along with it through a cleansing agent in another tank. This cleansing agent is preferably casing salt and acts as a coagulator to retain any mineral particles which stand in suspension in the oil and pass with the same through the filter, the casing salt (comprising the divided salt which collects around the joints in the pipes in salt works) also sustaining the pressure to permit of the continuous discharge of the oxygenized liquid into a suitable storage tank. After running about three hundred and fifty gallons of hydrocarbon liquid through the tank, about one fourth of a pound of salt is introduced into the solution for each additional gallon of hydrocarbon liquid discharged into the tank, sufficient water being supplied to maintain the solution at about the level hereinbefore indicated, as a small proportion of the water is of course lost during the purification process. When the water becomes foul as it does at infrequent intervals, the purification process is stopped to permit the water line, which of course rises above an outlet-pipe while the treatment of the oil is in progress, to settle below said pipe. The emulsion which stands on the water, and in appearance resembles thin gravy, is then drawn off through the outlet-pipe by opening a suitable valve. The salt water or the lower portion thereof, which is the foulest, may then be drawn off through drain pipe and when the purification process is resumed, the water withdrawn is replaced by fresh water and the proper supply of salt introduced to compensate for that lost by the withdrawal of the water.

While the operation is in progress, the tank always contains water and oil in about the proportion of ten to one, and in a plant which has a capacity of about three hundred and fifty gallons of water, the tank containing the same and three hundred and fifty pounds of salt also contains at all times about thirty-five gallons of oil, about thirty-four gallons of which stand at the top of the solution in the form of an emulsion and one gallon in the body of the solution, this one gallon being turned into an emulsion as rapidly as the emulsion at the top flows off through outlet pipe.

In my instant invention, I proceed to provide an emulsion of water and the hydrocarbon liquid to be purified by agitation but I have found that hardness of the water has a deleterious effect on the formation of the emulsion and does not permit the formation of a heavy emulsion with a consequent reduction in the efficiency of the process. I have found that a softening of the water will correct this condition and produce a much heavier emulsion than is possible with hard water. In order, therefore, to correct such conditions which are frequently encountered and to make it possible to use the process anywhere, I add to the water, either before or during the agitation for producing the emulsion hereinabove described, a small quantity of a water-softening agent, such as a trace of sodium hydroxide, and then proceed with the formation or production of the emulsion in the same manner as hereinabove described, and agitate the emulsion, as hereinabove and hereinafter described, in the softened water.

I have also discovered that a higher percentage of the heavier constituents and impurities in the hydrocarbon liquid may be removed if the droplets in the emulsion are, during the operation of agitation, bombarded, broken up and scoured by particles of an inert material and with this end in view I add to the saline solution a quantity of inert crystalline material, such as sand, ground coke or the like. Such an inert crystalline material may also, if desired, be substituted for all or a portion of the salt employed. In the preferred embodiment of my invention, however, I add to each gallon of solution in the tank a quantity amounting to one-half (½) pound of sand. Preferably, this sand employed comprises coarse particles of the size of granulated sugar so that a suspension of sand particles in the emulsion will be avoided, and when the agitator is operated, the same particles, when stirred by the agitators, will violently bombard the droplets of hydrocarbon liquid in the emulsion and apparently assist in separating the impurities and heavier constituents from the hydrocarbon liquid because I have found that the addition of sand or like material results in a greater yield of the heavier, impure constituents of the emulsion.

The sand hereinabove described may be added to the emulsion either before or during operation of the agitators but, in any event, is preferably thoroughly agitated into and throughout the emulsion and when so agitated in the emulsion provides a supplemental agitation that, as aforesaid, greatly assists in the separation and removal of impurities and heavier constituents from the hydrocarbon liquid and increases the percentage of heavier constituents that may be separated from a similar quantity of given impure hydrocarbon liquid. After softening of the water and agitation and bombardment or grinding of the particles of oil in the emulsion by inert crystalline material, as hereinabove described, the process is continued in substantial accordance with the method described in my aforesaid patent.

With these and other objects in view the invention may be carried out in any suitable apparatus. Such apparatus comprises in one of its adaptations the species or preferred form illustrated in the accompanying drawing, in which:

Figs. 1 and 2 show in section apparatus capable of carrying out my invention, Fig. 1 showing diagrammatically a container in which water, hydrocarbon and crystalline material are being mixed by agitating devices and Fig. 2 showing the same ingredients after settling thereof.

As an example of carrying out my invention in a small way, I may proceed as follows:

At room temperature, I put two (2) pounds of common salt comprising crystals (not table salt) of medium size or about the size of granulated sugar, in a three-gallon container 1 through a suitable inlet 1' and add, through said inlet, one gallon of water and one gallon of a hydrocarbon liquid, such as gasoline, that requires purification or refining, and about fifteen (15) grains of sodium hydroxide. The inlet and container are then closed and the contents agitated vigorously for about thirty seconds. This agitation may be accomplished in any suitable manner, as for example, by providing the container 1 with a suitable agitating device 2 comprising a shaft and paddles 2' rotated through gears 3' by motor 3 or by shaking the container itself. After thorough agitation for the time period specified, the salt crystals will settle very quickly to the bottom. The mixture of water, sodium hydroxide and hydrocarbon liquid will then separate more slowly into layers, one comprising the hydrocarbon liquid, another the water and on top of the water and below the hydrocarbon liquid will be noticed an emulsion-like settling with the inclusion of gas bubbles which have a tendency to make said emulsion-like settling float on the water.

By subjecting the material to sudden shocks or vibration, the settling of the liquids into three layers will be facilitated. After a suitable settling period, the top layer of hydrocarbon liquid may be siphoned off and further treated for clarification in substantial accordance with my aforesaid Patent No. 1,018,971, or it may be clarified by forcing said hydrocarbon liquid through a suitable pipe filled with a salt similar to that hereinabove specified that has been first dried in an oven above 212° F. During this filtering, any small particles remaining in suspension are removed and the hydrocarbon liquid liberated from any traces of water that it may contain.

According to my invention, I may substitute for the salt hereinabove specified, any inert crystalline substance, such as sand, ground coke etc., that will not react with the hydrocarbon liquid, or I may use such inert crystalline material preferably to the extent of one-half pound as hereinabove indicated, in association with the salt. I find that within certain limits and particularly within limits that will avoid suspension of inert material in the liquids, the finer the crystals of such inert material the quicker the results hereinabove specified may be obtained.

The dirty layer floating above the water may be thrown away and new gasoline added to the container and the operation repeated. Of course, the sodium hydroxide used is occasionally to be replaced.

Having described my invention, I claim:

1. The method of purifying hydrocarbon liquids consisting in providing in a container a given number of gallons of water, adding a material composed of inert crystalline sharp solid particles in a predetermined proportion in relation to the water, introducing into said container a hydrocarbon liquid in a quantity substantially equal to the quantity of water, agitating the liquids and crystalline material in said container to bombard the particles of hydrocarbon liquids with said crystalline material, settling the agitated substances into a bottom layer of crystalline material, intermediate layers of water and impurities and a top layer of hydrocarbon liquid, and thereafter separating the hydrocarbon liquid from the impurities.

2. The method of purifying hydrocarbon liquids consisting in providing in a container a given number of gallons of water, adding a water softening agent to the water, adding a material composed of inert crystalline sharp solid particles in approximately the proportion of two pounds thereof to one gallon of water, introducing into said container a hydrocarbon liquid in a quantity substantially equal to the quantity of water, agitating the liquids and crystalline material in said container to bombard the particles of hydrocarbon liquids with said crystalline material, settling the agitated substances into a bottom layer of crystalline material, intermediate layers of water and impurities and a top layer of hydrocarbon liquid, and thereafter separating the hydrocarbon liquid from the impurities.

3. The method of purifying hydrocarbon liquids consisting in providing in a container a given number of gallons of water, adding a small amount of an alkaline hydroxide to soften the water, introducing into said container a hydrocarbon liquid in a quantity substantially equal to the quantity of water, adding an inert crystalline material composed of sharp solid particles in a quantity sufficient to act as a scouring agent, agitating the liquids and inert crystalline material in said container to bombard the particles of hydrocarbon liquids with said crystalline material, settling the agitated substances into a bottom layer of inert crystalline material, intermediate layers of water and impurities and a top layer of hydrocarbon liquid, and thereafter separating the hydrocarbon liquid from the impurities.

4. The method of purifying hydrocarbon liquids consisting in providing in a container a given number of gallons of water, adding approximately fifteen grains of sodium hydroxide to each gallon of water to soften said water, introducing into said container a hydrocarbon liquid in a quantity substantially equal to the quantity of water, adding an inert crystalline material composed of sharp solid particles in a quantity sufficient to act as a scouring agent, agitating the liquids and inert crystalline material in said container to bombard the particles of hydrocarbon liquids with said crystalline material, settling the agitated substances into a bottom layer of inert crystalline material, intermediate layers of water and impurities and a top layer or hydrocarbon liquid, and thereafter separating the hydrocarbon liquid from the impurities.

5. The method of purifying hydrocarbon liquids consisting in providing in a container a refining bath composed of a predetermined quantity of water, two pounds of crystalline material composed of sharp solid particles to each gallon of water, and approximately fifteen grains of sodium hydroxide to each gallon of water, introducing into said bath a quantity of hydrocarbon liquid in substantially the same proportion as the water, violently agitating, for approximately thirty seconds, all the ingredients, settling such ingredients into a bottom layer of inert crystalline material, intermediate layers of water and impurities and a top layer of hydrocarbon liquid, and thereafter separating the hydrocarbon liquid from the impurities.

THOMAS S. HAMILTON.